(12) United States Patent
Liu

(10) Patent No.: US 6,647,644 B2
(45) Date of Patent: Nov. 18, 2003

(54) WELTED SHOE

(76) Inventor: Kun-Chung Liu, No. 5, Alley 9, Lane 212, San-Feng Rd., Hou-Li Hsiang, Taichung Hsien (TW)

(*) Notice: Subject to any disclaimer, the term of this patent is extended or adjusted under 35 U.S.C. 154(b) by 54 days.

(21) Appl. No.: 10/117,658

(22) Filed: Apr. 5, 2002

(65) Prior Publication Data

US 2003/0188454 A1 Oct. 9, 2003

(51) Int. Cl.⁷ .............................................. A43B 13/18
(52) U.S. Cl. ..................... 36/17 R; 36/17 PW; 36/77 R
(58) Field of Search ................. 36/17 R, 17 A, 36/17 PW, 12, 14, 23, 77 R; 12/142 RS, 142 T, 142 D

(56) References Cited

U.S. PATENT DOCUMENTS

| | | | | | |
|---|---|---|---|---|---|
| 2,354,338 A | * | 7/1944 | Stritter | ....................... | 36/17 R |
| 2,394,216 A | * | 2/1946 | Susswein | ..................... | 36/77 R |
| 2,437,030 A | * | 3/1948 | Hoza | .............................. | 36/14 |
| 2,438,016 A | * | 3/1948 | McMurray | .................. | 36/17 R |
| 2,958,965 A | * | 11/1960 | Scala | ............................. | 36/16 |
| 3,046,679 A | * | 7/1962 | Maertens et al. | ........... | 36/17 R |
| 3,107,443 A | * | 10/1963 | Binder et al. | ................. | 36/107 |
| 4,326,313 A | * | 4/1982 | Bensley | .................... | 12/142 D |
| 5,628,127 A | * | 5/1997 | Notzold | ......................... | 36/14 |

\* cited by examiner

*Primary Examiner*—M. D. Patterson
(74) *Attorney, Agent, or Firm*—Brooks Kushman P.C.

(57) ABSTRACT

A welted shoe includes an insole disposed within an upper. A welt member underlies a lower peripheral edge portion of the upper and together with a peripheral portion of the insole to form a sandwiched structure which is fastened by uprightly extending fastening members, such as stitches and rivets, to form a sub-assembly. An outsole is molded with the sub-assembly to form an outsole body underlying the welt member and a central portion of the insole, and a surrounding seal wall extending uprightly to surround completely the welt member and sealingly abutting against the upper to provide a good waterproofing effect.

5 Claims, 8 Drawing Sheets

WELTED SHOE

BACKGROUND OF THE INVENTION

1. Field of the Invention

This invention relates to a welted shoe, more particularly to a welted shoe with a simplified and waterproof structure.

2. Description of the Related Art

Referring to FIGS. 1 and 2, a conventional welted shoe disclosed in U.S. Pat. No. 6,192,605, is shown to include an upper 1 which is shaped over a last to impart a curve shape and which has a lower peripheral edge portion 2 that is bent underneath an insole 3 and that is joined thereto, and a molded midsole 4 which extends around the periphery of the upper 1 and which has a welt 5 and a midsole flange 6 integral with each other. The upper 1 and the insole 3 located therein are placed on the midsole 4 within the welt 5 so that the welt 5 engages the upper 1 around its periphery, and are joined together in a sub-assembly by stitching a plurality of stitches 7 through these components. The sub-assembly is placed on top of an outsole 8 having an outsole flange 9 which extends around the periphery of the upper 1. The outsole 8 is connected to the sub-assembly by stitching a plurality of stitches 10 through the flanges 6,9.

By virtue of the welt 5 which is not separately attached to any other shoe part, it is convenient to stitch the insole 3, the upper 1 and the midsole 4 together. However, the shoe does not have a good waterproofing effect because water can penetrate through a clearance between the welt 5 and the upper 1, along the stitch seam 7, and into the interior of the shoe.

SUMMARY OF THE INVENTION

The object of the present invention is to provide a welted shoe which is simple to manufacture and which has a good waterproofing effect.

According to this invention, the welted shoe includes an upper adapted to be lasted to form a surrounding wall with a profile and a lower peripheral edge portion. The surrounding wall surrounds a centerline and extends downwardly to terminate at a lower periphery. The lower peripheral edge portion extends from the lower periphery towards and in a plane normal to the centerline. An insole has a central portion, and a peripheral portion which surrounds the central portion and which is superimposed on the lower peripheral edge portion when the insole is engaged with the upper. A welt member is molded from a material more rigid than that of the upper, and includes a surrounding seat and a surrounding prop wall. The surrounding seat extends towards the centerline to terminate at an inner peripheral edge, and is disposed to underlie the lower peripheral edge portion. The surrounding seat, the lower peripheral edge portion and the peripheral portion of the insole together form a sandwiched structure. The surrounding prop wall extends uprightly from the surrounding seat and distal from the inner peripheral edge, is configured to abut against and wrap around the lower periphery so as to help keep the profile, and terminates at a surrounding upper edge. A plurality of fastening members are disposed to fasten the sandwiched structure along lines which are parallel to the centerline so as to form a sub-assembly. An outsole is molded with the sub-assembly to form an outsole body and a surrounding seal wall. The outsole body underlies the surrounding seat and the central portion, extends in longitudinal and transverse directions that are transverse to the centerline and outboard to the surrounding seat, and terminates at a surrounding outer peripheral edge. The surrounding seal wall extends uprightly from the surrounding outer peripheral edge to surround the surrounding prop wall and beyond the surrounding upper edge, and sealingly abuts against the surrounding wall.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
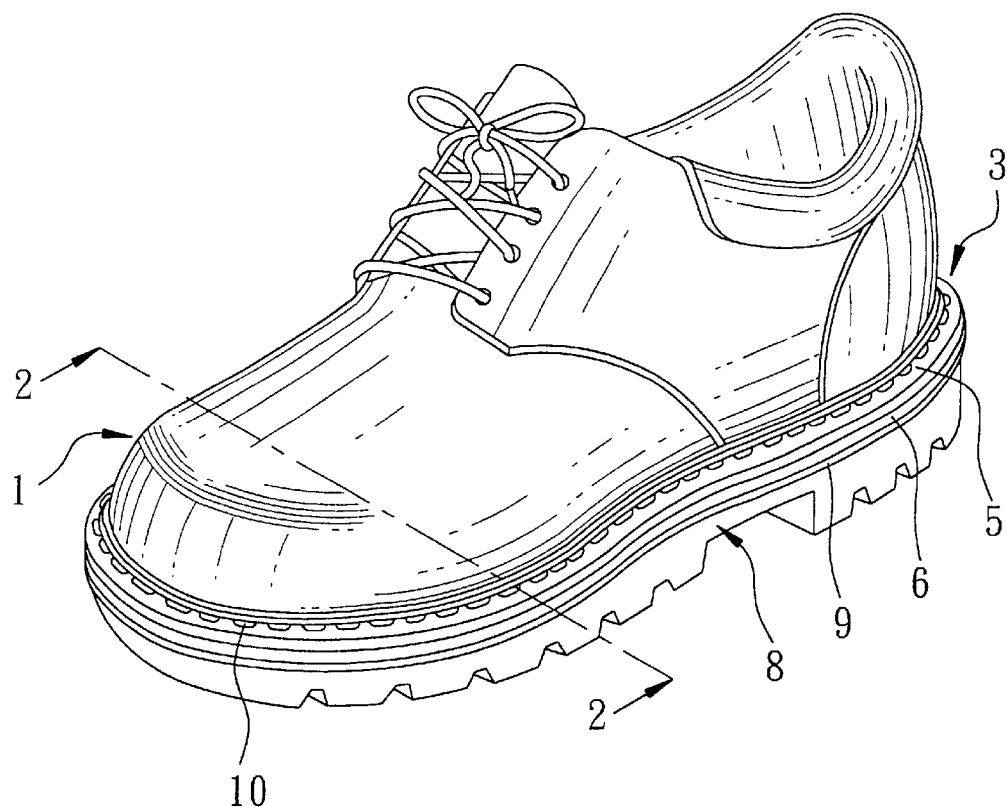
FIG. 1 is a perspective view of a conventional welted shoe.
Figure 2:
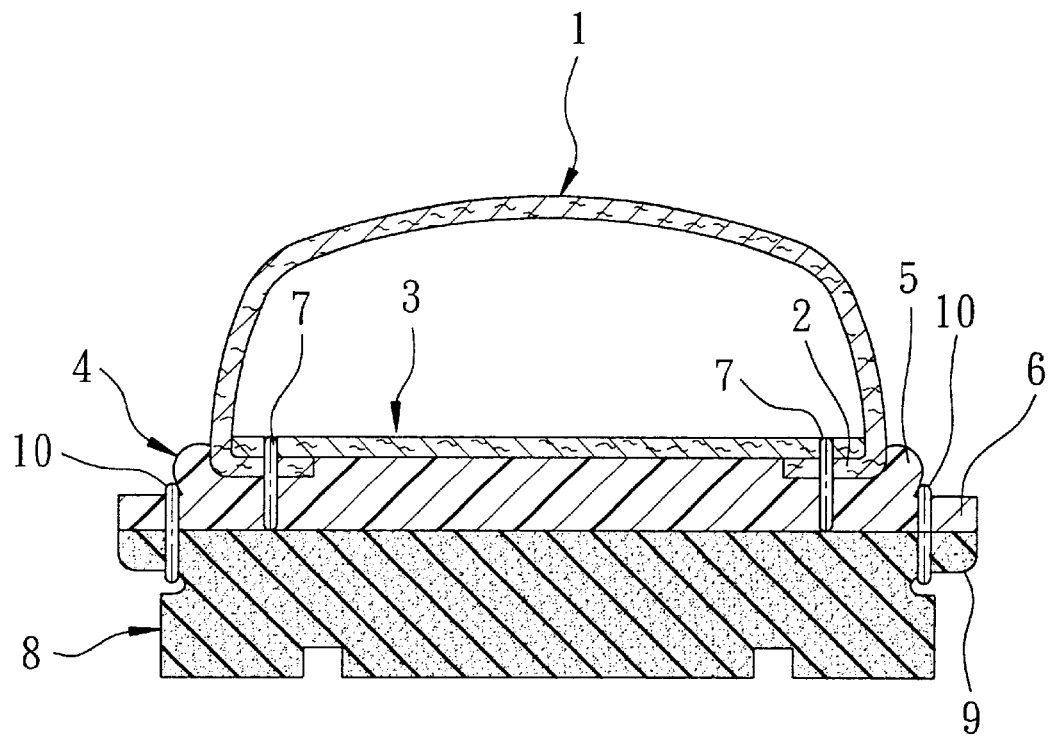
FIG. 2 is an enlarged sectional view taken along line 2—2 of FIG. 1.

Before the present invention is described in greater detail, it should be noted that same reference numerals have been used to denote like elements throughout the specification.

Figure 3:
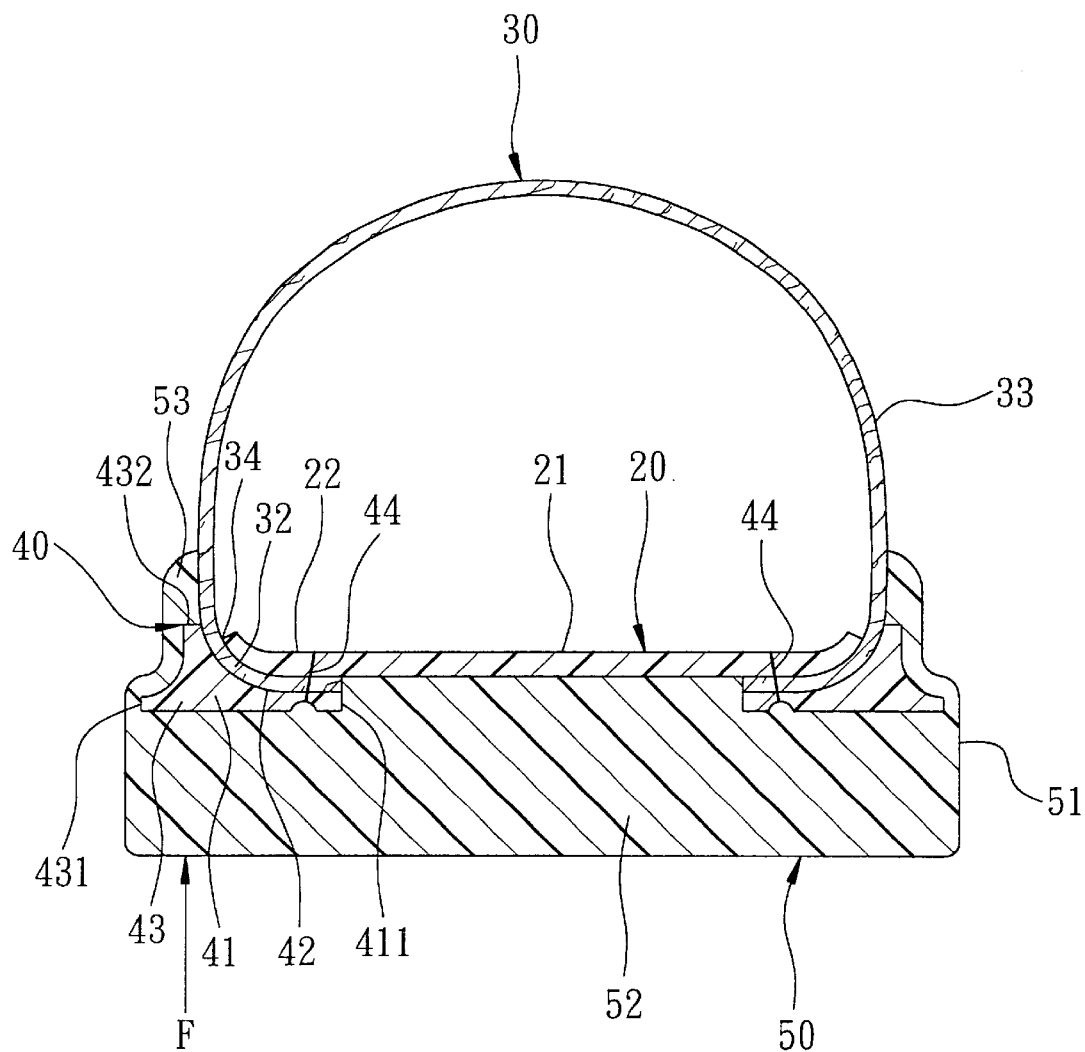
FIG. 3 is a cross-sectional view of a first preferred embodiment of a welted shoe according to this invention.

Referring to FIG. 3, the preferred embodiment of the welted shoe according to the present invention is shown to comprise an upper 30, an insole 20 mounted within the upper 30, a welt member 40, and an outsole 50.

The upper 30 is adapted to be lasted to form a surrounding wall 33 with a profile, and a lower peripheral edge portion 32. The surrounding wall 33 surrounds a centerline and extends downwardly to terminate at a lower periphery 34. The lower peripheral edge portion 32 extends from the lower periphery 34 towards and in a plane normal to the centerline.

The insole 20 has a central portion 21, and a peripheral portion 22 which surrounds the central portion 21 and which is superimposed on the lower peripheral edge portion 32 of the upper 30 when the insole 20 is engaged with the upper 30 by adhesives.

Figure 4:
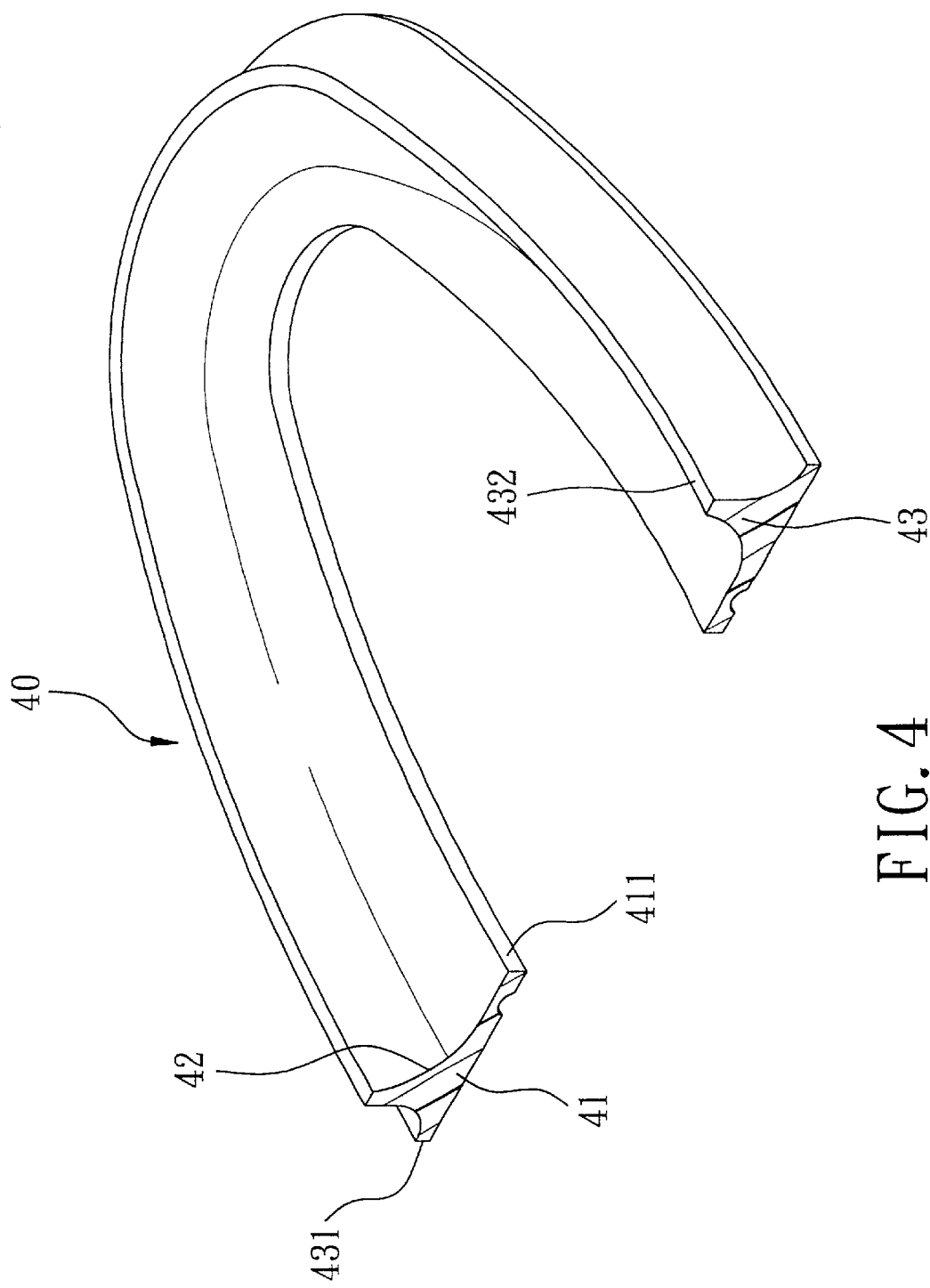
FIG. 4 is a fragmentary perspective view of a welt member of the first preferred embodiment.

With reference to FIG. 4, the welt member 40 is molded from a material more rigid than that of the upper 30, such as rigid PVC material, and includes a surrounding seat 41 which extends towards the centerline, which terminates at an inner peripheral edge 411, and which has a wall surface 42 that is disposed to underlie the lower peripheral edge portion 32 of the upper 30. Thus, the surrounding seat 41, the lower peripheral edge portion 32 of the upper 30, and the peripheral portion 22 of the insole 20 together form a sandwiched structure. A surrounding prop wall 43 extends uprightly from the surrounding seat 41 and distal from the inner peripheral edge 411, is configured to abut against and wrap around the lower periphery 34 so as to help keep the profile of the upper 30, and terminates at a surrounding upper edge 432. An outer portion 431 extends outwardly from the surrounding prop wall 43 and distal to the inner peripheral edge 411. A plurality of fastening members, such as stitches 44, extend through the peripheral portion 22 of the insole 20, the lower peripheral portion 32 of the upper 30, and the surrounding seat 41 of the welt member 40 to fasten the sandwiched structure along a line which is parallel to the centerline so as to form a sub-assembly.

The outsole 50 is formed from a molding material which is less rigid than that of the welt member 40, and is molded with the sub-assembly to form an outsole body 52 and a surrounding seal wall 53. The outsole body 52 underlies the surrounding seat 41 and the central portion 21, extends in longitudinal and transverse directions that are transverse to the centerline and outboard to the surrounding seat 41, and terminates at a surrounding outer peripheral edge 51. The surrounding seal wall 53 extends uprightly from the surrounding outer peripheral edge 51 to surround the surrounding prop wall 43 and beyond the surrounding upper edge 432, and sealingly abuts against the surrounding wall 33 of the upper 30. In other words, the sub-assembly is disposed in a mold (not shown) for injection molding of the outsole 50 such that the outsole 50 is formed immediately below the sub-assembly, and such that the molding material penetrates into the sub-assembly to fill clearances present among these components of the sandwiched structure and to embed the welt member 40 in the surrounding seal wall 53. As such, water can be prevented from entering into the welted shoe via the upper 30 and the welt member 40.

As illustrated, when the shoe according to this invention is subjected to a force (F), such as that shown in FIG. 3, the welt member 40 can prevent deformation of the profile of the upper 30. In addition, the surrounding seal wall 53 can protect the surrounding wall 33 of the upper 30 against wearing.

Figure 5:
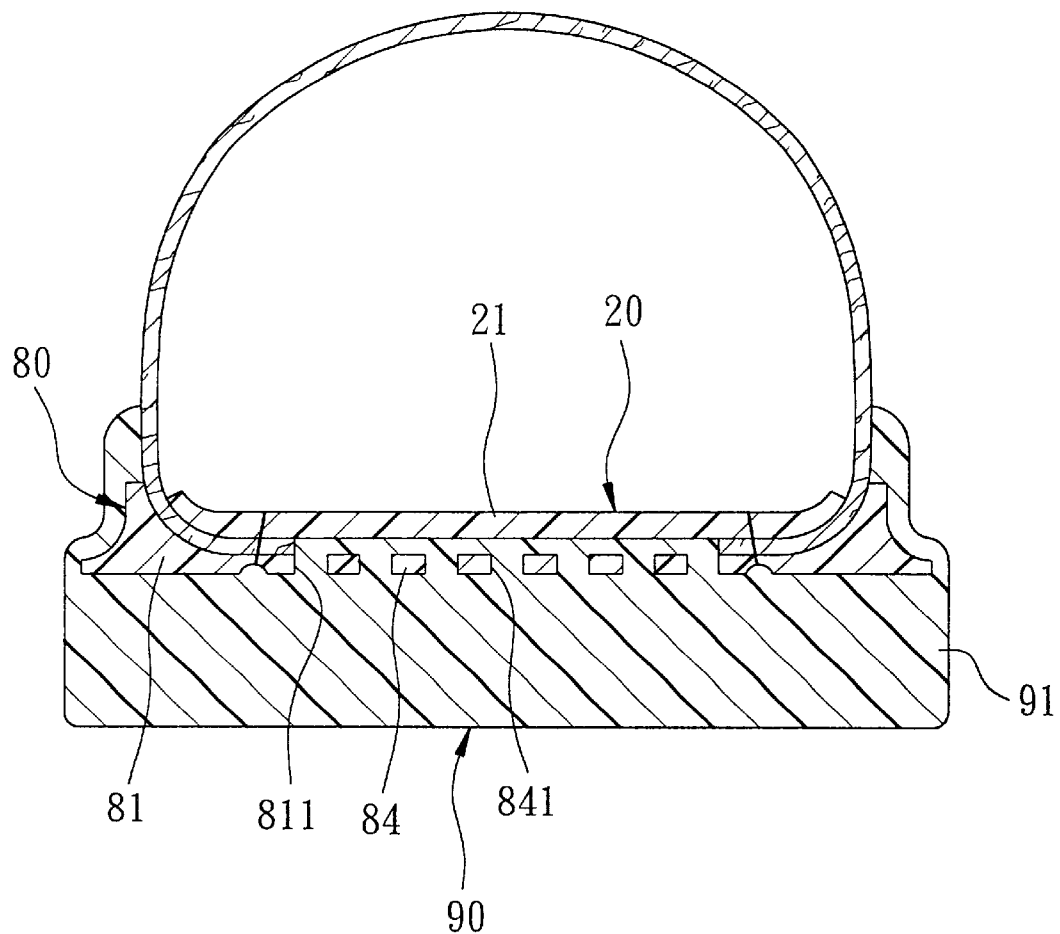
FIG. 5 is a cross-sectional view of a second preferred embodiment according to this invention.
Figure 6:
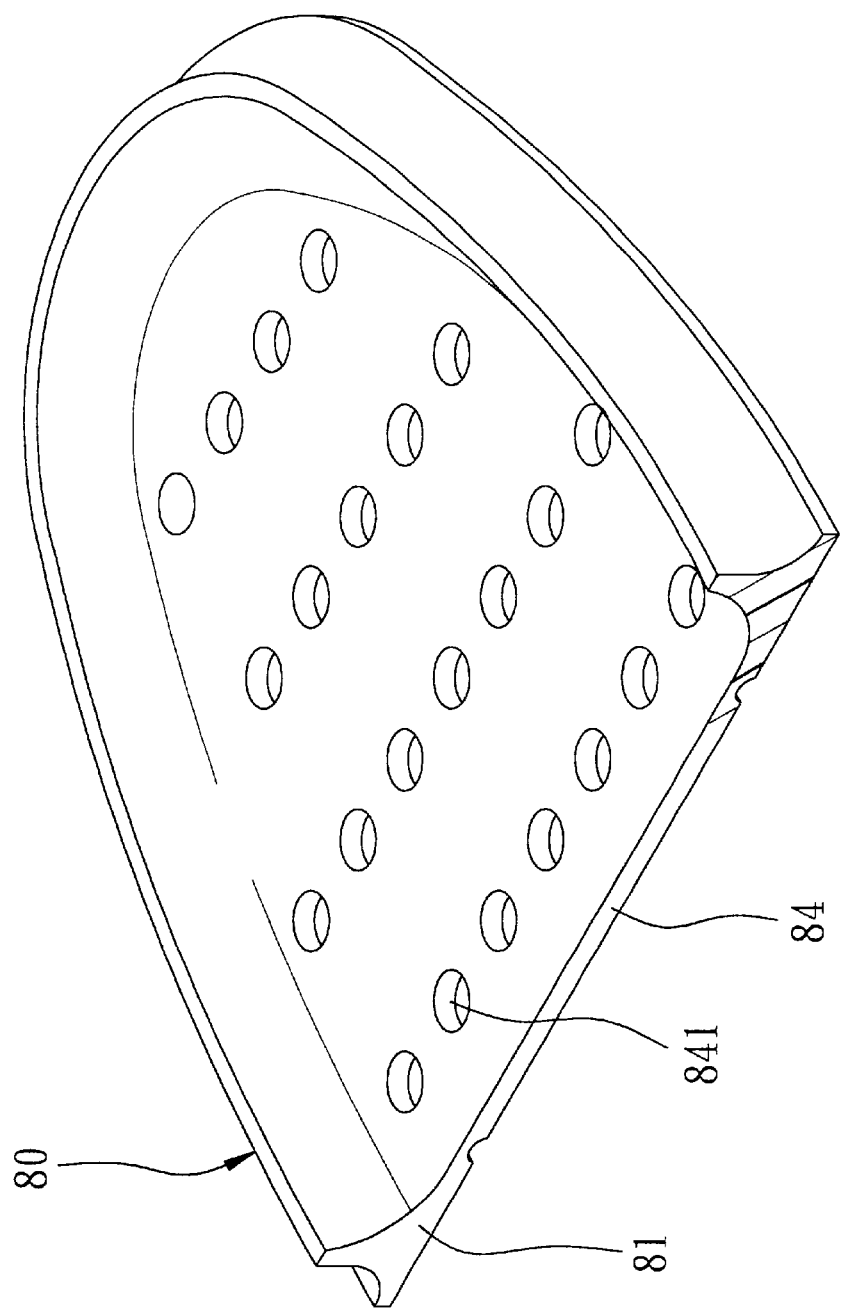
FIG. 6 is a fragmentary perspective view of a welt member of the second preferred embodiment.

FIGS. 5 and 6 illustrate the second preferred embodiment of this invention. As shown, a welt member 80 further includes a perforated portion 84 which extends in the longitudinal and transverse directions to contact an inner peripheral edge 811 of a surrounding seat 81. The perforated portion 84 is disposed to underlie the central portion 21 of the insole 20, and is formed with a plurality of penetrating holes 841 extending therethrough in a direction parallel to the centerline such that when an outsole 90 is molded with the sub-assembly, the molding material, which forms an outsole body 91, flows into the penetrating holes 841.

Figure 7:
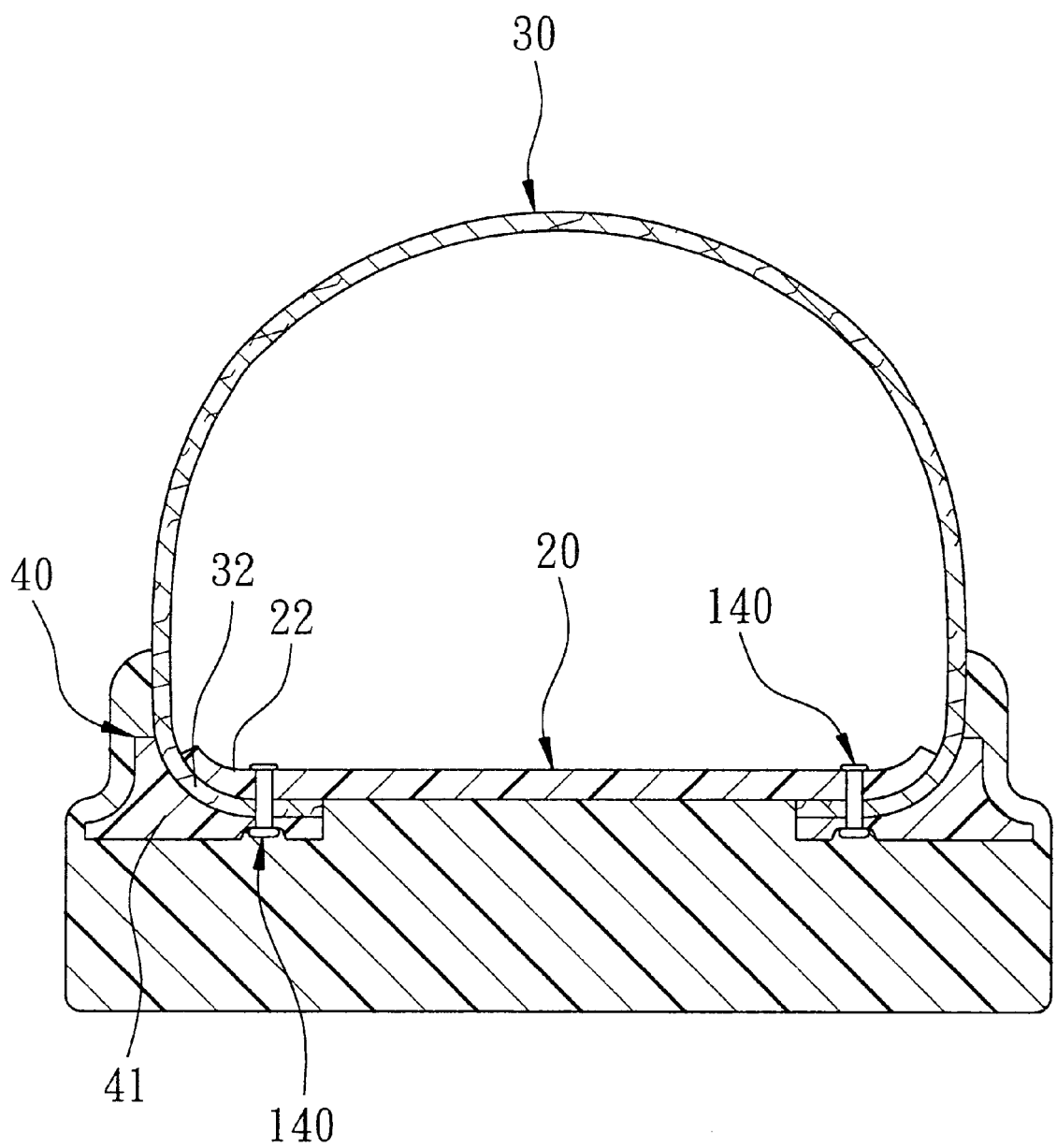
FIG. 7 is a cross-sectional view of a third preferred embodiment according to this invention.

With reference to FIG. 7, the third preferred embodiment of this invention is similar to the first preferred embodiment in construction, except that the fastening members are a plurality of rivets 140 which pass through the sandwiched structure of the peripheral portion 22 of the insole 20, the lower peripheral portion 32 of the upper 30, and the surrounding seat 41 of the welt member 40.

Figure 8:
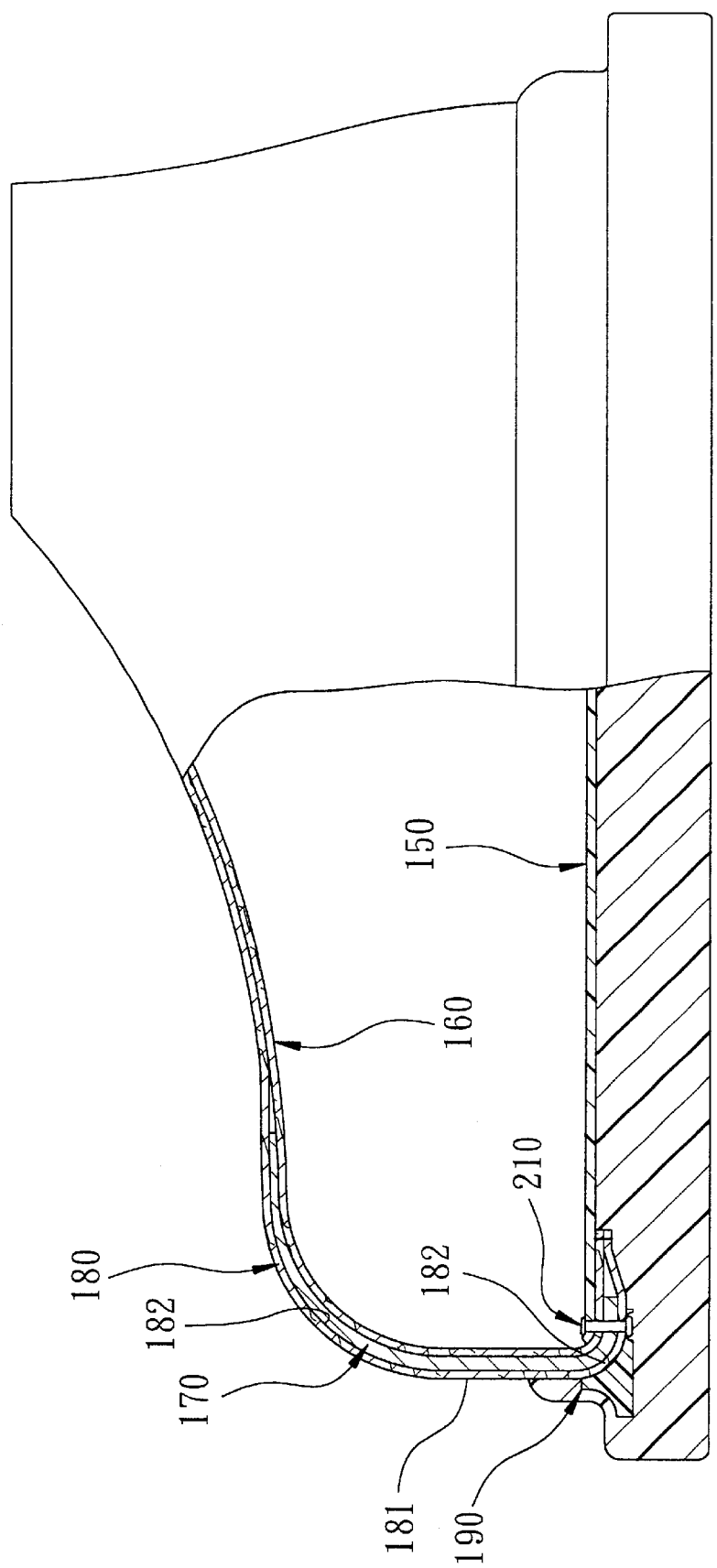
FIG. 8 is a partly sectional schematic view of a fourth preferred embodiment according to this invention.

Referring to FIG. 8, the fourth preferred embodiment of this invention is shown to be a safety boot, in which an upper includes a toe cap 180 with outer and inner surfaces 181,182 which are opposite to each other and which are distal from and proximate to the centerline, respectively. A lining layer 160 is disposed to be spaced apart from the inner surface 182 of the toe cap 180 by an accommodation space. A shield member 170, which is made of a steel material, is disposed in the accommodation space, and extends to be disposed on the lower peripheral portion 182 of the upper at the toe cap 180. A plurality of rivets 210 pass through the shield member 170 and the lining layer 160 to fasten the same to the sandwiched structure of an insole 150, the upper, and a welt member 190.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A welted shoe comprising:
   an upper adapted to be lasted to form a surrounding wall with a profile, and a lower peripheral edge portion, said surrounding wall surrounding a centerline and extending downwardly to terminate at a lower periphery, said lower peripheral edge portion extending from said lower periphery towards, and in a plane normal to the centerline;
   an insole having a central portion, and a peripheral portion which surrounds said central portion, and which is superimposed on said lower peripheral edge portion when said insole is engaged with said upper;
   a welt member molded from a material more rigid than that of said upper, and including
      a surrounding seat which extends towards the centerline to terminate at an inner peripheral edge, and which is disposed to underlie said lower peripheral edge portion, said surrounding seat, said lower peripheral edge portion, and said peripheral portion of said insole together forming a sandwiched structure, and
      a surrounding prop wall which extends uprightly from said surrounding seat and distal from said inner peripheral edge, which is configured to abut against and wrap around said lower periphery so as to help keep the profile, and which terminates at a surrounding upper edge;
   a plurality of fastening members, each fastening said sandwiched structure along a line which is parallel to the centerline so as to form a sub-assembly; and
   an outsole molded with said sub-assembly to form an outsole body which underlies said surrounding seat and said central portion, which extends in longitudinal and transverse directions that are transverse to the centerline and outboard to said surrounding seat, and which terminates at a surrounding outer peripheral edge, and a surrounding seal wall which extends uprightly from said surrounding outer peripheral edge to surround said surrounding prop wall and beyond said surrounding upper edge and which sealingly abuts against said surrounding wall.

2. The welted shoe of claim 1, wherein each of said fastening members is a stitch which stitches said sandwiched structure along the line.

3. The welted shoe of claim 1, wherein each of said fastening members includes a rivet which passes through said sandwiched structure.

4. The welted shoe of claim 3, wherein said upper includes a toe cap having outer and inner surfaces which are opposite to each other and distal from and proximate to the centerline, respectively, said welted shoe further comprising a lining layer disposed to be spaced apart from said inner surface of said toe cap by an accommodation space, and a shield member disposed in said accommodation space and extending to be disposed on said lower peripheral edge portion, said rivet passing through said shield member and said lining layer to fasten the same to said sandwiched structure.

5. The welted shoe of claim 1, wherein said welt member further includes a perforated portion which extends in the longitudinal and transverse directions to contact said inner peripheral edge, which is disposed to underlie said central portion of said insole, and which is formed with a plurality of penetrating holes extending therethrough in a direction parallel to the centerline such that when said outsole is molded with said sub-assembly, molding material which forms said outsole body flows into said penetrating holes.

* * * * *